US009982694B2

(12) United States Patent (10) Patent No.: US 9,982,694 B2
Scroggie et al. (45) Date of Patent: May 29, 2018

(54) PUSH THROUGH RETAINER CONNECTION WITH INTEGRATED HINGING SEAL

(71) Applicant: ILLINOIS TOOL WORKS INC., Glenview, IL (US)

(72) Inventors: Derek Scroggie, Macomb, MI (US); Michelle E. Bozinovski, Oakland Charter Township, MI (US); Robert A. Murawski, Clinton Township, MI (US)

(73) Assignee: Illinois Tool Works Inc., Glenview, IL (US)

( * ) Notice: Subject to any disclaimer, the term of this patent is extended or adjusted under 35 U.S.C. 154(b) by 272 days.

(21) Appl. No.: 14/652,819

(22) PCT Filed: Dec. 9, 2013

(86) PCT No.: PCT/US2013/073861
§ 371 (c)(1),
(2) Date: Jun. 17, 2015

(87) PCT Pub. No.: WO2014/099444
PCT Pub. Date: Jun. 26, 2016

(65) Prior Publication Data
US 2015/0322985 A1 Nov. 12, 2015

Related U.S. Application Data

(60) Provisional application No. 61/739,604, filed on Dec. 19, 2012.

(51) Int. Cl.
*F16B 19/00* (2006.01)
*F16B 5/00* (2006.01)
(Continued)

(52) U.S. Cl.
CPC .............. *F16B 5/0084* (2013.01); *F16B 2/22* (2013.01); *F16B 5/0607* (2013.01); *F16B 19/00* (2013.01);
(Continued)

(58) Field of Classification Search
CPC ........ F16B 2/22; F16B 5/0084; F16B 5/0607; F16B 5/0657; F16B 19/00; F16B 19/008;
(Continued)

(56) References Cited

U.S. PATENT DOCUMENTS 3,249,973 A * 5/1966 Seckerson ........... B60R 13/0206
24/297
3,550,217 A * 12/1970 Collyer ................. F16B 5/0642
411/508

(Continued)

FOREIGN PATENT DOCUMENTS

FR 2913738 A1 9/2008
WO 2009123616 A1 10/2009

OTHER PUBLICATIONS

ISR and WO for PCT/US2013/073861 dated Mar. 28, 2014.

*Primary Examiner* — Roberta S Delisle
(74) *Attorney, Agent, or Firm* — Joseph M. Butscher; The Small Patent Law Group, LLC

(57) ABSTRACT

A connection assembly adapted to join a surface element to an underlying support structure while maintaining a substantially zero gap abutting relation between the surface element and the support structure. The connection assembly includes a press-in retainer with a circumferential seal having a sealing foot. The sealing foot flexes about a living hinge while maintaining continuous sliding contact with the support panel without interfering with downward movement of the retainer.

20 Claims, 4 Drawing Sheets

(51) Int. Cl.
*F16B 5/06* (2006.01)
*F16B 2/22* (2006.01)
*F16B 21/08* (2006.01)

(52) U.S. Cl.
CPC .......... *F16B 19/008* (2013.01); *F16B 21/086* (2013.01); *F16B 5/0657* (2013.01); *F16B 2005/0678* (2013.01); *Y10T 24/44026* (2015.01); *Y10T 29/49828* (2015.01)

(58) Field of Classification Search
CPC .... F16B 21/084; F16B 21/086; F16B 21/088; F16B 2005/0678; F16B 5/065
USPC .......................................... 411/508, 509, 510
See application file for complete search history.

(56) References Cited

U.S. PATENT DOCUMENTS

| | | | | |
|---|---|---|---|---|
| 3,678,797 A | * | 7/1972 | Seckerson | F16B 21/086 411/509 |
| 3,745,612 A | * | 7/1973 | Seckerson | F16B 21/086 411/508 |
| 3,771,275 A | * | 11/1973 | Seckerson | F16B 5/065 403/388 |
| 4,534,530 A | | 8/1985 | Danko | |
| 4,778,320 A | * | 10/1988 | Nakama | F16B 5/065 24/297 |
| 5,028,187 A | * | 7/1991 | Sato | F16B 19/1081 411/41 |
| 5,173,026 A | | 12/1992 | Cordola et al. | |
| 5,339,491 A | * | 8/1994 | Sims | B60R 16/0215 16/2.2 |
| 5,458,365 A | * | 10/1995 | Rogers | B60R 21/215 280/728.3 |
| 5,704,753 A | * | 1/1998 | Ueno | F16B 21/086 24/297 |
| 5,797,714 A | * | 8/1998 | Oddenino | B60R 13/0206 411/508 |
| 5,865,500 A | * | 2/1999 | Sanada | B60R 19/52 180/68.6 |
| 6,572,317 B2 | * | 6/2003 | Okada | F16B 5/0657 24/297 |
| 6,715,185 B2 | * | 4/2004 | Angellotti | F16B 5/065 24/297 |
| 6,805,524 B2 | * | 10/2004 | Kanie | F16B 5/02 411/174 |
| 7,481,474 B2 | * | 1/2009 | Higgins | F16B 21/086 24/292 |
| 7,770,266 B2 | * | 8/2010 | Higgins | F16B 21/086 24/297 |
| 7,927,050 B2 | * | 4/2011 | Koike | F16B 5/0628 411/104 |
| 2005/0079033 A1 | * | 4/2005 | Benedetti | F16B 21/086 411/508 |
| 2006/0099051 A1 | | 5/2006 | Moerke | |
| 2010/0098515 A1 | | 4/2010 | Raymond | |
| 2010/0293761 A1 | * | 11/2010 | Koike | F16B 21/086 24/458 |
| 2011/0119875 A1 | | 5/2011 | Iwasaki | |
| 2011/0243688 A1 | | 10/2011 | Klein et al. | |

* cited by examiner

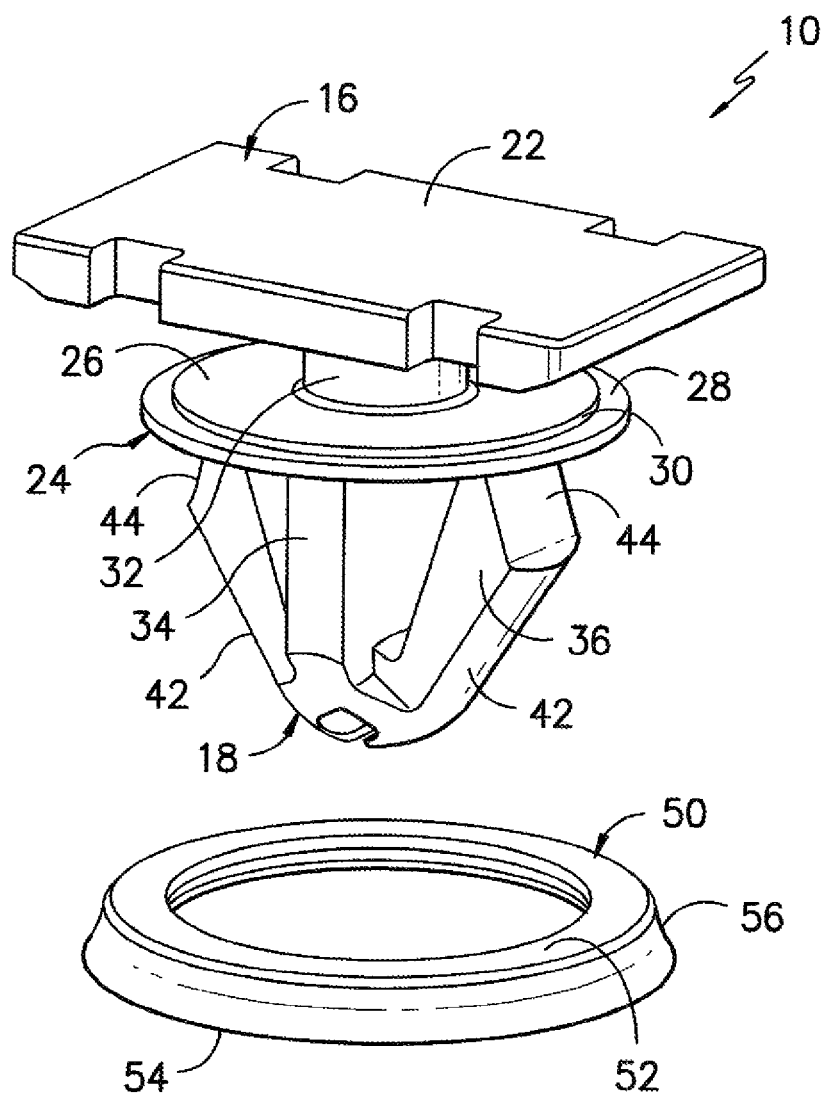
FIG. -1-

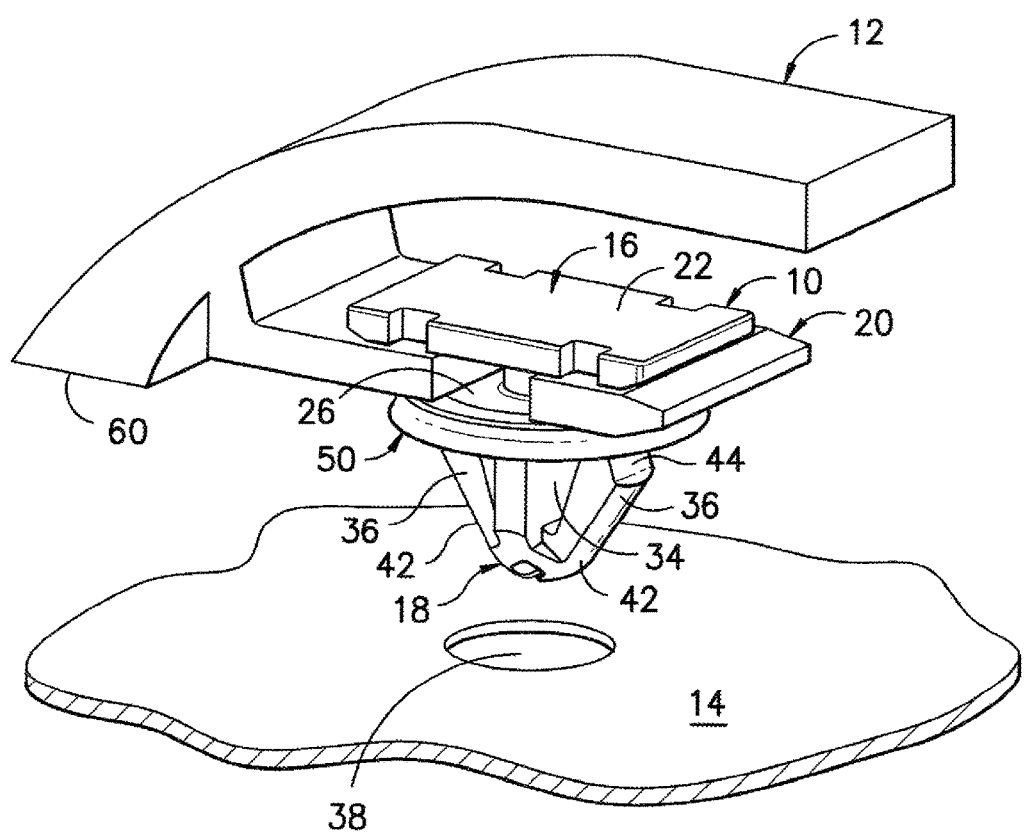
FIG. -2-

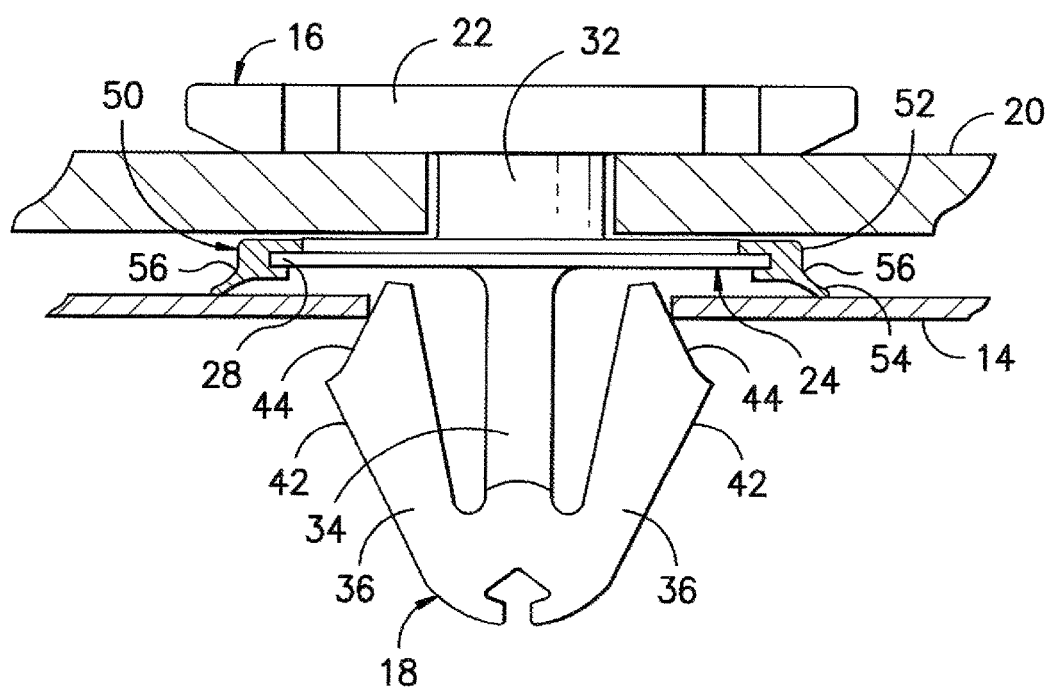
FIG. -3-

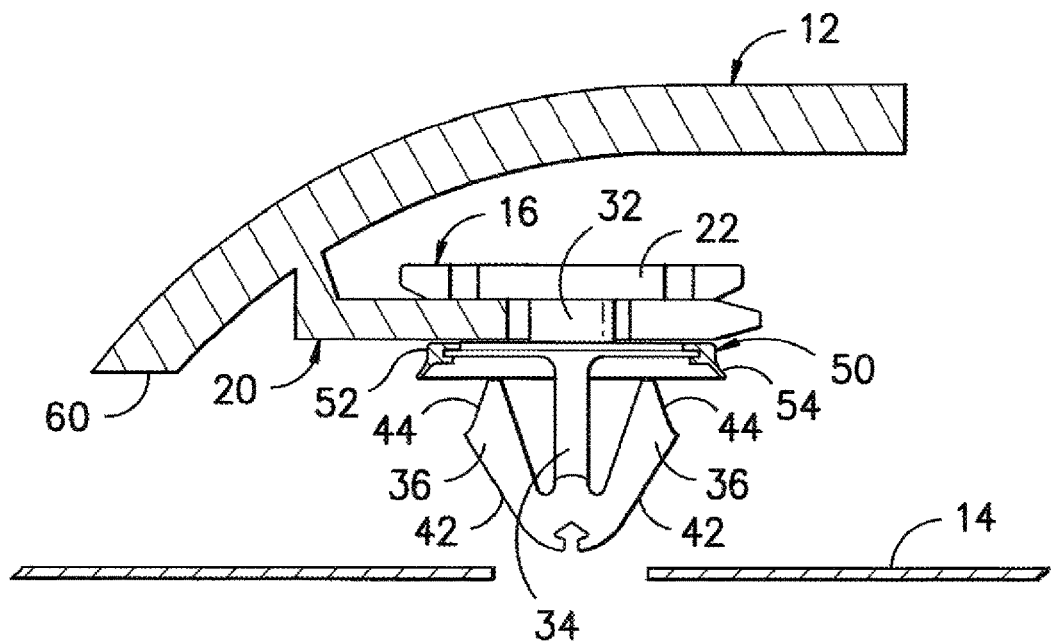
FIG. -4-
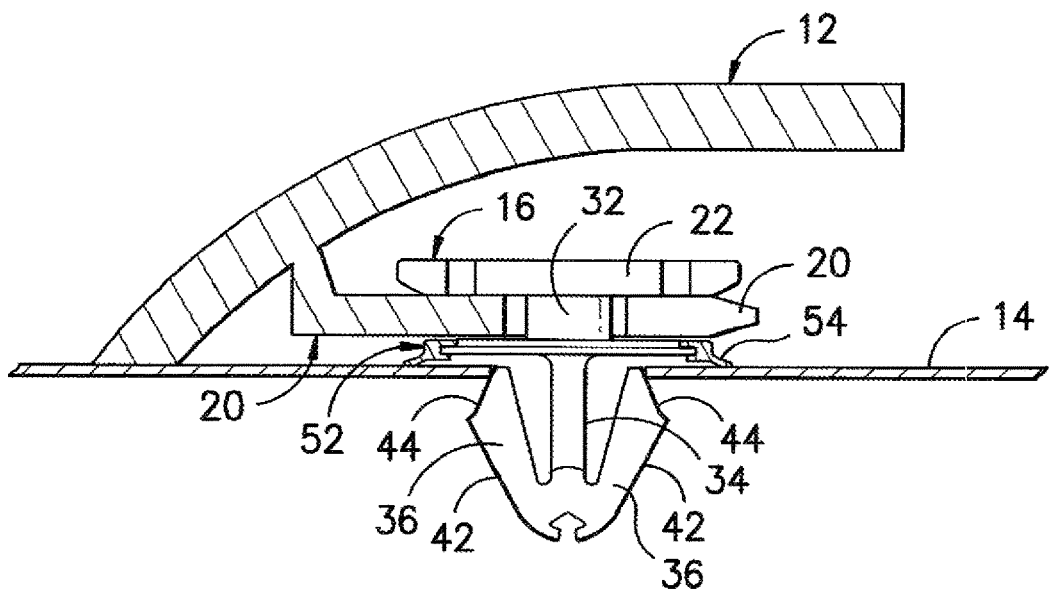
FIG. -5-

PUSH THROUGH RETAINER CONNECTION WITH INTEGRATED HINGING SEAL

CROSS-REFERENCE TO RELATED APPLICATIONS

This application is a National Phase of International Application Number PCT/US2013/073861 filed Dec. 9, 2013 and claims the benefit of, and priority from, U.S. provisional application 61/739,604 filed Dec. 19, 2012. The contents of such provisional application and all other patent documents referenced in this application are hereby incorporated by reference in their entirety as if fully set forth herein.

TECHNICAL FIELD

The present disclosure relates generally to connection assemblies incorporating retainers which may also be referred to as fasteners. More particularly, this disclosure pertains to connections incorporating push-in type retainers having downward biasing wing features which secure the retainer in place after insertion through an aperture and with seals for creating a barrier to the penetration of moisture, dust and noise through the aperture in which the retainer is secured.

BACKGROUND

Push-in type W-base retainers are used in a variety of connection assemblies to secure components of the assembly. For example, in automobiles such stud-like retainers are used to secure molding or other surface structures to underlying support elements such as body panels, support beams or the like. Such retainers typically include a stem with deflectable wing elements for securing the retainer to the support elements when the stem portion supporting the deflectable wing elements is pushed through an aperture in the support element. Typically, a head attached to the stem is configured for attachment to a doghouse or other complementary receiving element on the underside of the surface structure. In this regard, the head may include an enhanced diameter upper platform radial collar feature and an enhanced diameter lower radial collar feature with a spacing post extending between the upper and lower radial collar features. Thus, the spacing post may slide into a doghouse or other receiving element as will be well known to those of skill in the art and thereafter be blocked against axial withdrawal by the upper and lower radial collar features.

During use, as the stem is inserted into the aperture, the deflectable members may be compressed radially inwardly. The deflectable members then may spring outwardly as insertion is completed to lock behind the underside of the support element. Thus, with the head secured to the surface structure, the retainer forms a connection between the surface structure and the underlying support element.

W-base retainers are typically designed as a component of an overall assembly and work in conjunction with the other components with the goal of establishing and maintaining a "zero gap" condition between the sheet metal panel or other support element and the molding or other surface structure. To promote the desired "zero gap" condition, the W-base retainers typically provide a continuous pull down or clamp load condition. This constant pull down is intended to provide and maintain the desired "zero gap" condition between the support element and the molding or other surface structure. If this pull down force is compromised by a significant force acting in the opposite direction such that the molding or other surface structure does not seat against the sheet metal panel or other support element, an unacceptable gap condition may occur within the final assembled product. Such a gap condition may result in undesired rattling noise as well as in the introduction of dirt and water between the molding or other surface structure and the underlying support structure.

As much as is reasonably possible, it is generally desirable to limit the generation of squeaks, rattles and objectionable noises that may be created from movement of the retainer relative to the parts to which it is connected. By way of example only, and not limitation, various sealing arrangements for push through retainers are illustrated and described in U.S. Pat. No. 5,173,026 to Cordola et al. and US published application 2006/0099051 to Moerke, the contents of all of which are incorporated herein by reference in their entirety. To minimize corrosion, it is desirable also to prevent moisture from precipitation, carwashes, etc. from seeping past the retainer, and through the aperture in which the retainer is installed.

A variety of sealing structures have been used to minimize rattles and squeaks and to prevent moisture seepage past the retainer. Independent concave skirts such as described in US published application 2006/0099051 have been used in conjunction with push-in retainers at the base of the head to confront the body panel around the aperture in the panel. Elastomeric and foam seals also have been used to further improve sealing qualities against moisture penetration.

Although retainers as described incorporating concave skirts and/or seals have been used successfully to limit squeaks and rattles and to inhibit the penetration of moisture past the retainer, further improvements are desirable. Installing the seal as a separate part is cumbersome and awkward, complicating installation of the retainer. If installed on the retainer in advance, the seal can become dislodged, even if properly placed on the retainer. In automated assembly plants, a retainer missing a seal may not be detected and may be installed on the article in which it is used inadvertently. A loose retainer of this type will rattle or squeak, may provide a path for the penetration of moisture and may not adequately secure the second article or item as required. If the seal is adhered to the skirt of the retainer, the seal may not function optimally if the retainer is not seated squarely in the panel. Further, the position of the seal relative to the retainer skirt has limited the range of panel thicknesses with which the retainer can be used effectively to provide a seal against moisture intrusion.

As will be understood by those of skill in the art, a seal which is held between the retainer head and the support panel may experience a build, stack up condition as compression force is applied which results in a counteracting upward force being applied against the head which may partially offset the pull-down force provided by the deflectable wings. In some cases, the presence of seal elements which are compressed between the retainer head and the support panel may block the lower collar feature of the retainer from getting close enough to the underlying sheet metal panel to establish the desired "zero gap" condition between the sheet metal panel and the overlying molding or other surface structure. That is, the compressed seal in stack-up condition may act in the manner of a spacing shim holding the retainer head further away than intended from the sheet metal panel or other underlying support element. With the retainer head in this elevated condition, the attached molding or other surface element will likewise be held away from the panel or other support element and a gap condition may result.

SUMMARY

The present disclosure provides advantages and alternatives over the prior art by providing a connection assembly including a push-in type retainer having a functional sealing feature that does not experience a build, stack up condition that may reduce the clamp load force. Thus, the retainer is not blocked from assuming its designed orientation relative to the sheet metal panel or other underlying support element. A "zero gap" condition is thereby established and maintained between the sheet metal panel or other underlying support element and the mating molding substrate or other surface element.

In accordance with one exemplary feature, the present disclosure provides a connection assembly adapted to join a surface element such as molding or the like to an underlying support structure such as a sheet metal panel or the like while maintaining a substantially zero gap abutting relation between the surface element and the support structure during use. The connection assembly includes a press-in retainer adapted for insertion into an acceptance opening in the support structure to establish operative connecting engagement between the surface element and the support structure. The retainer includes a retainer head and a clip portion of arrowhead configuration projecting outwardly away from the retainer head. The retainer head includes an upper platform and an annular platform defining a lower collar positioned in spaced relation below the upper platform. The clip portion includes a central stem extending downwardly away from the lower collar and a pair of flexible wings extending in upward angled relation away from a central stem. The retainer further includes a seal disposed at least partially about the lower collar. The seal includes a body portion engaging the lower collar and a sealing foot projecting downwardly and radially outwardly away from the body portion to a free edge such that the sealing foot is disposed outboard from the lower collar. The underside of the sealing foot forms an obtuse angle relative to the underside of the lower collar. The sealing foot flexes about a living hinge while remaining outboard from the lower collar and maintains continuous sliding contact with the support panel in response to applied pressure between the seal and the support panel during use.

Other features and advantages of the present disclosure will become apparent from a description of certain preferred embodiments thereof which are shown in the drawings.

BRIEF DESCRIPTION OF THE DRAWINGS

FIG. 1 is an exploded perspective view illustrating an exemplary sealing retainer in accordance with the present disclosure with the seal separated from the retainer body;

FIG. 2 is an elevation perspective view illustrating an exemplary sealing retainer in accordance with the present disclosure engaging trim molding prior to insertion through a sheet metal support panel;

FIG. 3 is a cross-sectional view illustrating an exemplary sealing retainer in accordance with the present disclosure in normal operative connecting relation between a doghouse surface connector and an underlying support panel with wing elements in the inserted self-adjusting downward biasing condition;

FIG. 4 is a cross-sectional view illustrating an exemplary sealing retainer in accordance with the present disclosure engaging trim molding prior to insertion through a sheet metal support panel and with the seal in an unstressed condition; and FIG. 5 is a cross-sectional view illustrating an exemplary sealing retainer in accordance with the present disclosure engaging trim molding after full insertion through a sheet metal support panel with a retained "zero gap" condition between the trim molding and the support panel and illustrating the compression action of the seal in an extreme insertion condition.

Before the embodiments of the disclosure are explained in detail, it is to be understood that the disclosure is not limited in its application to the details of construction and the arrangements of the components set forth in the following description or illustrated in the drawings. The disclosure is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION

Referring now more specifically to the drawings, and to FIGS. 1 and 2 in particular, it may be seen that the present disclosure provides a retainer 10 adapted to secure a molding 12 or other surface element to a sheet metal support panel 14 or other underlying support element of metal or the like. As shown, in the illustrated exemplary construction, the retainer 10 includes a retainer head 16 and a snap engaging clip portion 18. As will be appreciated, the retainer head 16 and the clip portion 18 may be formed as a monolithic unitary body by injection molding or other suitable molding or fabrication process. The material for retainer 10 can be selected as optimally desirable for its particular installation and use. Accordingly, the retainer 10 may be formed of suitable plastic, such as Nylon, polypropylene, acetal resin and the like as will be well known to those of skill in the art. Acetal resin and Nylon 6.6 may be preferred in some environments of use. Of course, other polymeric and non-polymeric materials including metal and the like and combinations of various polymeric materials also may be used if desired. Likewise, it should be understood that the particular configurations for the retainer head 16 and for the clip portion 18 may be varied in a manner as may be desired for a particular installation.

By way of example only, and not limitation, in the illustrated exemplary construction for the retainer 10, the retainer head 16 is adapted for sliding receipt and retention within an intermediate connector 20 (FIG. 2) such as a dog house connector or the like disposed in hidden relation at the underside of the molding 12. In this regard, the intermediate connector 20 may be formed integral with the molding 12 as shown or may be a separate attached structure as may be desired.

As shown, in the illustrated exemplary construction, the retainer head 16 includes a table-like upper platform 22 disposed in opposing relation to a lower collar 24 of substantially rigid, annular construction. In this regard, while the upper platform 22 is illustrated as having a generally rectangular configuration, it is likewise contemplated that other polygonal or circular geometries may be used if desired. As shown, the lower collar 24 may be in substantially perpendicular non-angled orientation to the travel path of the retainer and may include an interior collar portion 26 and a reduced thickness outer annular lip 28 disposed circumferentially about the interior collar portion such that a step 30 is disposed at the intersection of the interior collar portion 26 and the outer annular lip 28. A neck structure 32 in the form of a reduced diameter post extends between the upper platform 22 and the lower collar 24. As will be understood, the effective outer diameters defined by the upper platform 22 and by the lower collar 24 are preferably greater than the effective outer diameter defined by the neck structure 32.

In operation, the retainer 10 may be operatively secured to the intermediate connector 20 by sliding the neck structure 32 into a slot in the intermediate connector 20 in a manner as will be well known to those of skill in the art. The intermediate connector may, in turn, be attached to the overlying molding 12 or other surface element. Likewise, the retainer head 16 may be connected directly to an overlying component by techniques such as tape, adhesive bonding, mechanical joining or the like if desired.

As indicated previously, the retainer 10 further includes a clip portion designated generally as 18 extending away from the underside of the lower collar 24. In the illustrated exemplary construction, the clip portion 18 includes a stem 34 projecting away from the lower collar 24 such that the lower collar is oriented substantially perpendicular to an axis defined by the stem. As illustrated, wing elements 36 extend upwardly in angled relation away from the end of the stem 34. The wing elements 36 are adapted to flex inwardly towards the stem 34 during insertion through an acceptance opening 38 in the support panel 14. As best seen through joint reference to FIGS. 1 and 3, in the illustrated exemplary construction each of the wing elements 36 incorporates an outer face having a dogleg configuration facing generally outwardly away from the stem 34. In this regard, in the illustrated construction, the outer face of each wing element 36 includes a proximal face surface 42 extending in angled relation away from the axis defined by the stem 34. A distal face surface 44 extends away from the proximal face surface in angled relation back towards the axis defined by the stem 34 ultimately terminating at the free tip of the wing element thereby establishing the outer surface dogleg profile. As shown, the free tips of the wing elements are at an elevation below the lower collar 24.

As best seen through joint reference to FIGS. 1-3, a monolithic perimeter seal 50 of flexible polymeric material is disposed about the perimeter of the lower collar 24 generally at the intersection between the retainer head 16 and the clip portion 18. As best seen in FIG. 3, the inner diameter of the perimeter seal 50 may substantially cover the outer annular lip 28 of the lower collar 24 and may abut the step 30. The perimeter seal 50 may be formed from commercially available moldable materials such as thermoplastic elastomers including, by way of example only, polyolefins, PVC, silicone rubber, PTFE, polyvinylidene fluoride (PVDF), fluorinated ethylene propylene (FEP) and blends thereof. Such materials will preferably be of lower durometer (i.e. are less rigid) than the material forming the retainer head and may be characterized by a useful operating temperature range of about −75° C. to about 175° C. In accordance with one exemplary construction, the perimeter seal 50 may be formed by over-molding or two-shot molding processes such that during molding the flexible material forming the perimeter seal 50 is integrally fused with the more rigid acetal resin or other material forming the lower collar 24. It is also contemplated that the perimeter seal 50 may be formed separately with a circumferential acceptance slot around the interior for receipt and retention of the annular lip 28 in a stretch-fit relation if desired. In any event, the seal 50 defines a relatively soft, deformable covering at the perimeter edge of the lower collar 24 adapted to provide a seal around the acceptance opening 38 in the support panel 14 during use without the need for any sealing structures oriented below the lower collar.

As best seen in FIG. 3, the perimeter seal 50 may be substantially annular and may include a main body portion 52 adapted to cover the outer annular lip 28 of the lower collar 24. A hingeable outwardly flared sealing foot 54 extends in angled relation downwardly and radially away from the main body portion 52. As shown, the sealing foot 54 is elongated and relatively thin in cross-section. In an unstressed condition (FIG. 4), the sealing foot 54 extends radially outboard from the main body portion 52 to a free edge such that the sealing foot is disposed entirely outboard from lower collar 24 and the underside of the sealing foot forms an obtuse angle relative to the underside of the lower collar 24. As shown, no portion of the angled sealing foot 54 is in the zone below the lower collar 24.

When the sealing foot 54 is pressed against the support panel 14 during normal use, the sealing foot 54 readily flexes upwardly towards a flattened condition about a living hinge 56 substantially at the intersection with the body portion 52. This hinging takes place without confinement of the sealing foot between the support panel 14 and the lower collar 24 while continuously maintaining contacting engagement with the underlying support panel. Thus, the sealing foot 54 may flex from its unstressed condition (FIG. 4) to its fully flexed position (FIG. 5) without experiencing a stack-up condition of seal material between the support panel 14 and the lower collar 24. As the sealing foot 54 flexes during compression, the edge of the sealing foot 54 moves radially outwardly as the sealing foot 54 takes on a more flattened condition. As this flattening takes place, the sealing foot 54 moves out of the way of the travel path for the lower collar 24. This avoids any confinement and stack-up of seal material between the support panel 14 and the lower collar 24 while nonetheless maintaining a sealing condition relative to the support panel 14. Accordingly, the retainer head 16 and the attached molding 12 may be pulled downwardly to a position wherein the molding 12 and the underlying support panel form a substantially flush "zero gap" condition while maintaining a seal around the acceptance opening 38. In this regard, it will be understood that such a zero gap condition occurs when a contact surface 60 on the molding 12 assumes a contacting abutting relation with the underlying support panel 14. As will be appreciated, the elevation and contour of the contact surface 60 may be selected to provide this zero gap condition when the sealing foot 54 is in a flexed condition relative to the support panel 14 and with the lower collar 24 elevated relative to the support panel 14.

Referring now to FIGS. 2 and 3, it will be seen that in normal operation (FIG. 3), a portion of the sloped distal face surface 44 may be in contacting relationship with the inner perimeter surface of the acceptance opening 38. In the normal operating condition shown in FIG. 3, the retainer 10 is urged downwardly continuously as the flexed wing elements press outwardly against the perimeter surface of the acceptance opening 38. However, downward movement will be limited once the molding 12 comes into contact with the underlying support panel 14 to establish a zero gap condition. Thus, in the condition shown by FIG. 3, a condition of static equilibrium is established when the molding 12 comes into contact with the underlying support panel 14. Since the retainer 10 is urged continuously downwardly due to the sloped distal face surface 44, the retainer will naturally assume and retain the level at which the molding 12 contacts the underlying support panel 14 and thereby blocks further downward movement. As shown, in this equilibrium condition, the lower collar 24 remains slightly elevated relative to the support panel 14 and the sealing foot 54 of the perimeter seal 50 is hinged outwardly while maintaining a sealing relationship against the support panel 14. As can be seen, the sealing foot 54 is adapted to flex outwardly in a hinging action as the retainer moves downwardly without blocking further downward movement by the retainer 10.

As will be appreciated, the equilibrium position of the retainer 10 within the acceptance opening 38 is continuously self-adjusting as the relative positions of the molding 12 and the support panel 14 change during use as a result of vibration or other events. In this regard, the living hinge 56 urges the sealing foot 54 continuously against the underlying support panel 14 as the sealing foot 54 attempts to resume its normal unflexed condition (FIG. 4). Thus, the sealing relationship provided by the sealing foot 54 is maintained by sliding contact as the retainer 10 moves up and down and the sealing foot 54 moves radially in and out during equilibrium adjustment. That is, although the angle between the support panel 14 and the sealing foot 54 may change as the retainer 10 moves up and down, the sealing relation is maintained as the sealing foot 54 moves in sliding relation over the support panel. Moreover, since the sealing foot 54 is not confined between the lower collar 24 and the support panel 14, downward movement of the molding is unobstructed by the sealing element.

As best seen in FIG. 5, in the event of extreme insertion such that the tips of the wing elements wing elements 36 are within the acceptance opening, in the support panel 14, the sealing foot 54 may assume a substantially flattened condition against the underlying support panel 14 as the molding 12 establishes a "zero gap" condition with the support panel. Even in this extreme insertion condition, the sealing foot is not confined between the lower collar 24 and the support panel 14. Accordingly, no stack-up condition and resultant shim action is created. Thus, the molding 12 may continue to be pulled down to the desired "zero gap" condition over the full range of operative engagement positions between the wing elements 36 and the support panel 14 with the sloped distal face surface 44 bearing against the support panel.

The ability to avoid a stack-up condition is promoted by maintaining the free space between the lower collar 24 and the underlying support panel during downward movement such that portions of the seal material do not collect in the free space in a manner which would limit downward movement. This free space below the lower collar is maintained even in the extreme insertion condition shown in FIG. 5. As shown, all portions of the sealing foot 54 are positioned radially outboard from the lower collar 24 and the free edge of the sealing foot 54 is adapted to slide radially outwardly away from the lower collar 24 and the main body portion 52 as the retainer head 16 moves downwardly and the sealing foot 54 hinges outwardly. Thus, the sealing foot 54 flattens by hinging outwardly about the living hinge 56 as it is pressed against an underlying support panel 14. Accordingly, the sealing foot 54 does not interfere with downward movement of the retainer head 16 and the molding 12 may be maintained in a "zero gap" condition with the underlying support panel 14.

While various spatial and directional terms, such as upper, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Of course, variations and modifications of the foregoing are within the scope of the present disclosure. It is to be understood that the disclosure disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

What is claimed is:

1. A connection assembly adapted to join a surface element to an underlying support structure while maintaining a substantially zero gap, abutting relation between the surface element and the support structure during use, the connection assembly comprising:
a press-in retainer adapted for insertion into an acceptance opening in the support structure to establish operative connecting engagement between the surface element and the support structure, the retainer including a retainer head and a clip portion of arrowhead configuration projecting outwardly away from the retainer head, wherein the retainer head includes an upper platform and an annular platform defining a lower collar positioned in spaced relation below the upper platform, wherein the clip portion comprises a central stem extending downwardly away from the lower collar and a pair of flexible wings extending in upward angled relation away from a central stem, the retainer further including a seal disposed at least partially about the lower collar, the seal having a durometer lower than the lower collar and including a body portion engaging the lower collar and a sealing foot projecting downwardly and radially outwardly away from the body portion to a free edge such that the sealing foot is disposed outboard from lower collar and the underside of the sealing foot forms an obtuse angle relative to the plane of the underside of the lower collar, and wherein the sealing foot flexes about a living hinge while remaining outboard from the lower collar and maintaining sliding contact with the support panel in response to applied pressure between the seal and the support panel during use.

2. The connection assembly as recited in claim 1, wherein the retainer head and clip portion are molded as a unitary structure.

3. The connection assembly as recited in claim 1, wherein the lower collar is oriented substantially perpendicular to an axis defined by the stem and has a stepped construction including an interior portion and a reduced thickness outer annular lip with a step between the interior portion and the outer annular lip.

4. The connection assembly as recited in claim 3, wherein the seal is formed by over-molding or two-shot molding in fused, overlying relation about the outer annular lip of the lower collar.

5. The connection assembly as recited in claim 3, wherein the retainer head and clip portion are molded as a unitary structure from a polymer selected from the group consisting of Nylon 6, Nylon 6.6, and acetal resin.

6. The connection assembly as recited in claim 3, wherein the seal is molded from a thermoplastic elastomer.

7. The connection assembly as recited in claim 3, wherein the retainer head and clip portion are molded as a unitary structure from acetal resin, and wherein the seal is molded from a thermoplastic elastomer.

8. The connection assembly as recited in claim 1, wherein the wings each have a dog-leg configuration including a radially inwardly angled segment defining an angled biasing surface disposed between a radially outwardly angled segment and a free end, the angled biasing surface being adapted to press against an interior surface of the acceptance opening to urge the retainer downwardly into the acceptance opening.

9. The connection assembly as recited in claim 1, wherein the retainer head includes a connective neck structure extending between the upper platform and the lower collar, and wherein the neck structure is adapted to slidingly engage an intermediate doghouse connector operatively joined to the surface element.

10. A connection assembly adapted to join a surface element to an underlying support structure while maintaining a substantially zero gap abutting relation between the surface element and the support structure during use, the connection assembly comprising:
a press-in retainer adapted for insertion into an acceptance opening in the support structure to establish operative connecting engagement between the surface element and the support structure, the retainer including a retainer head and a clip portion of arrowhead configuration projecting outwardly away from the retainer head, wherein the retainer head includes an upper platform, an annular platform defining a lower collar having a perimeter edge positioned in spaced relation below the upper platform, and a connective neck structure extending between the upper platform and the lower collar, wherein the clip portion comprises a central stem extending downwardly away from the lower collar such that the lower collar is oriented substantially perpendicular to an axis defined by the stem, a pair of flexible wings extending in upward angled relation away from the central stem, the flexible wings terminating at wing tips disposed in spaced relation below the lower collar, wherein the flexible wings each have a dog-leg configuration including a radially inwardly angled segment defining an angled biasing surface disposed between a radially outwardly angled segment and a free end, the angled biasing surface being adapted to press against an interior surface of the acceptance opening to urge the retainer downwardly into the acceptance opening, the retainer further including a monolithic seal disposed about the perimeter edge of the lower collar, the seal having a durometer lower than the lower collar, the seal including a body portion at least partially surrounding the perimeter edge and the seal further including an integral hinging sealing foot projecting downwardly and radially outwardly away from the body portion to a free edge such that the sealing foot is disposed entirely outboard from the underside of the lower collar and forms an obtuse angle relative to the underside of the lower collar, and wherein the sealing foot flexes about a living hinge while remaining outboard from the lower collar and maintaining sliding contact with the support panel in response to applied pressure between the seal and the support panel during use;
a preformed surface element having a contact surface configured to abut the support structure in a substantially gapless relation during use; and
an intermediate connector operatively connected to the surface element and adapted to receive and retain the retainer head such that upon insertion of the retainer into an acceptance opening in the support panel, an operative connection is established between the surface element and the support structure, wherein the surface element is configured such that when the retainer is held between the intermediate connector and the support structure, the contact surface of the surface element is at an elevation such that it abuts the support structure while the sealing foot is in contacting relation with the support structure and the lower collar remains spaced in elevated relation away from the support structure.

11. The connection assembly as recited in claim 10, wherein the retainer head and clip portion are molded as a unitary structure.

12. The connection assembly as recited in claim 10, wherein the lower collar has a stepped construction including an interior portion and a reduced thickness outer annular lip with a step between the interior portion and the outer annular lip, and wherein the seal is formed from a material of lower durometer than the material forming the lower collar.

13. The connection assembly as recited in claim 12, wherein the seal is formed by over-molding or two-shot molding in fused, overlying relation about the outer annular lip of the lower collar.

14. The connection assembly as recited in claim 12, wherein the retainer head and clip portion are molded as a unitary structure from a polymer is selected from the group consisting of Nylon 6, Nylon 6.6, and acetal resin.

15. The connection assembly as recited in claim 12, wherein the seal is molded from a thermoplastic elastomer.

16. The connection assembly as recited in claim 12, wherein the retainer head and clip portion are molded as a unitary structure from acetal resin, and wherein the seal is molded from a thermoplastic elastomer.

17. The connection assembly as recited in claim 10, wherein the intermediate connector is a doghouse connector adapted to slidingly receive and retain the connective neck structure.

18. The connection assembly as recited in claim 10, wherein, the intermediate connector is integral with the preformed surface element.

19. The connection assembly as recited in claim 10, wherein, the intermediate connector is configured such that the contact surface is at an elevation below the lower collar and above the free edge of the sealing foot when the retainer head is supported within the intermediate connector and prior to insertion into the acceptance opening.

20. A method of connecting a surface element to an underlying support structure while maintaining a substantially zero gap abutting relation between the surface element and the support structure during use, the method comprising:
providing a press-in retainer adapted for insertion into an acceptance opening in the support structure to establish operative connecting engagement between the surface element and the support structure, the retainer including a retainer head and a clip portion of arrowhead configuration projecting outwardly away from the retainer head, wherein the retainer head includes an upper platform, an annular platform defining a lower collar having a perimeter edge positioned in spaced relation below the upper platform, and a connective neck structure extending between the upper platform and the lower collar, wherein the clip portion comprises a central stem extending downwardly away from the lower collar and a pair of flexible wings extending in upward angled relation away from the central stem, the flexible wings terminating at wing tips disposed in spaced relation below the lower collar, wherein the flexible wings each have a dog-leg configuration including a radially inwardly angled segment defining an angled biasing surface disposed between a radially outwardly angled segment and a free end, the angled biasing surface being adapted to press against an interior surface of the acceptance opening to urge the retainer downwardly into the acceptance opening, the retainer further including a monolithic seal disposed about the perimeter edge of the lower collar, the seal having a durometer lower than the lower collar, the seal including a body portion at least partially surrounding the perimeter edge and the seal further including an integral hinging sealing foot projecting downwardly and radially outwardly away from the body portion to a free edge such that the sealing foot is disposed entirely outboard from the underside of the lower collar and forms an obtuse angle relative to the underside of the lower collar, and wherein the sealing foot flexes about a living hinge while remaining outboard from the lower collar and maintaining sliding contact with the support panel in response to applied pressure between the seal and the support panel during use;

providing a preformed surface element having a contact surface configured to abut the support structure in a substantially gapless relation during use;

securing the retainer head within an intermediate connector operatively connected to the surface element; and inserting the retainer into an acceptance opening in the support panel, to establish an operative connection between the surface element and the support structure, wherein the surface element is configured such that when the retainer is held between the intermediate connector and the support structure, the contact surface of the surface element is at an elevation such that it abuts the support structure while the sealing foot is in flexed contacting relation with the support structure and the lower collar remains spaced in elevated relation away from the support structure.

* * * * *